(12) United States Patent
Kurki et al.

(10) Patent No.: US 11,965,779 B2
(45) Date of Patent: Apr. 23, 2024

(54) APPARATUS FOR MEASURING RAMAN SPECTRUM AND METHOD THEREOF

(71) Applicant: TimeGate Instruments Oy, Oulu (FI)

(72) Inventors: Lauri Kurki, Oulu (FI); Ilkka Alasaarela, Kuusamo (FI); Jussi Tenhunen, Oulu (FI)

(73) Assignee: TimeGate Instruments Oy, Oulu (FI)

( * ) Notice: Subject to any disclaimer, the term of this patent is extended or adjusted under 35 U.S.C. 154(b) by 281 days.

(21) Appl. No.: 17/763,957

(22) PCT Filed: Oct. 28, 2020

(86) PCT No.: PCT/FI2020/050710
§ 371 (c)(1),
(2) Date: Mar. 25, 2022

(87) PCT Pub. No.: WO2021/089913
PCT Pub. Date: May 14, 2021

(65) Prior Publication Data
US 2022/0373392 A1 Nov. 24, 2022

(30) Foreign Application Priority Data
Nov. 5, 2019 (FI) .................................... 20195947

(51) Int. Cl.
*G01J 3/44* (2006.01)
*G01J 3/02* (2006.01)
(Continued)

(52) U.S. Cl.
CPC ............... *G01J 3/44* (2013.01); *G01J 3/0208* (2013.01); *G01J 3/0218* (2013.01);
(Continued)

(58) Field of Classification Search
CPC .......... G01J 3/44; G01J 3/0208; G01J 3/0218; G01J 3/0297; G01J 3/14; G01J 3/1895;
(Continued)

(56) References Cited

U.S. PATENT DOCUMENTS

| 7,576,308 B1 | 8/2009 | Gruneisen |
| 8,633,437 B2 * | 1/2014 | Dantus .................... G01N 21/65 250/281 |

(Continued)

FOREIGN PATENT DOCUMENTS

| EP | 2336739 A1 | 6/2011 |
| WO | 2013140159 A1 | 9/2013 |

OTHER PUBLICATIONS

Finnish Patent and Registration Office, Search Report, Application No. 20195947, dated May 12, 2020, 2 pages.
(Continued)

*Primary Examiner* — Isiaka O Akanbi
(74) *Attorney, Agent, or Firm* — Ziegler IP Law Group

(57) ABSTRACT

An apparatus for measuring time-resolved optical spectrum includes a light source, a sensor for collecting, forming, manipulating and measuring the intensity of the optical radiation, and a controller coupled to the light source and sensor. The sensor includes at least one optical delay element to provide a time delay to a first portion of the optical radiation. The sensor arrangement further includes an optical spectral disperser to split the delayed first portion and the second portion of the optical radiation into dispersed radiation having a plurality of wavelengths, and a sensor element configured to receive each wavelength of the dispersed radiation on a different spatial region, and measure the light intensity associated with each wavelength of the dispersed radiation. The controller collects the light intensity associated with each wavelength of the dispersed radiation mea-
(Continued)

sured by the sensor element to form a time-resolved optical spectrum.

19 Claims, 7 Drawing Sheets

(51) Int. Cl.
  *G01J 3/14* (2006.01)
  *G01J 3/18* (2006.01)
  *G01J 3/26* (2006.01)
(52) U.S. Cl.
  CPC .............. *G01J 3/0297* (2013.01); *G01J 3/14* (2013.01); *G01J 3/1895* (2013.01); *G01J 3/26* (2013.01); *G01J 2003/262* (2013.01)
(58) Field of Classification Search
  CPC ...... G01J 3/26; G01J 2003/262; G01J 3/0205; G01J 3/021; G01J 3/18; G01J 3/2803; G01J 3/2889; G01N 21/65; G02B 27/0938
  USPC .......................................... 356/300–334, 457
  See application file for complete search history.

(56) References Cited

U.S. PATENT DOCUMENTS

| | | | |
|---|---|---|---|
| 10,352,863 B1 | 7/2019 | Pohl | |
| 2003/0025917 A1* | 2/2003 | Suhami | G01B 9/02091 356/601 |
| 2007/0252978 A1* | 11/2007 | Van Der Voort | G01N 21/65 356/300 |
| 2009/0290209 A1 | 11/2009 | Kubo | |
| 2010/0067003 A1* | 3/2010 | Marcu | G01J 3/02 356/318 |
| 2011/0261354 A1* | 10/2011 | Sinfield | G01J 3/021 356/301 |
| 2012/0044490 A1 | 2/2012 | Bowlan | |
| 2013/0222801 A1* | 8/2013 | Harel | G01J 3/447 356/300 |
| 2014/0268131 A1* | 9/2014 | Tamada | G01J 3/0218 356/301 |
| 2016/0091429 A1* | 3/2016 | Huber | H01S 3/302 356/301 |
| 2016/0178439 A1* | 6/2016 | Freudiger | G01J 3/44 356/301 |
| 2017/0284940 A1* | 10/2017 | Butte | G01J 3/4406 |
| 2018/0031851 A1 | 2/2018 | Wilcox | |

OTHER PUBLICATIONS

Notification of Transmittal of The International Search Report and The Written Opinion of The International Searching Authority, or The Declaration, Application No. PCT/FI2020/050710, dated Feb. 10, 2021, 16 pages.

Dorrer, Christophe, "Spatiotemporal Metrology of Broadband Optical Pulses", IEEE Journal of Selected Topics in Quantum Electronics, vol. 25, No. 4, pp. 1-16, XP055758035, ISSN: 1077-260X, DOI: 10.1109/JSTQE.2019.2899019, Feb. 12, 2019, 16 pages.

* cited by examiner

APPARATUS FOR MEASURING RAMAN SPECTRUM AND METHOD THEREOF

TECHNICAL FIELD

The present disclosure relates generally to spectroscopy; and more specifically, to time-resolved optical spectroscopy; and even more specifically, to time-gated Raman spectroscopy. Moreover, the present disclosure is concerned with apparatus for measuring a time-resolved optical spectrum, or more specifically a time-gated Raman spectrum. Furthermore, the present disclosure is concerned with methods for measuring a time-resolved optical spectrum, or more specifically a time-gated Raman spectrum.

BACKGROUND

Optical spectroscopy is the study of interaction between matter and light, particularly electromagnetic radiation. The types of optical spectroscopy generally include, but are not limited to, atomic spectroscopy, ultraviolet and visible spectroscopy, infrared spectroscopy, Raman spectroscopy and so forth. Raman spectroscopy is based on the phenomenon that light, such as a laser light when incident on a substance cause molecular vibrations and experience inelastic scattering. Such scattered light is detected by a Raman spectrometer, based on which the substance and spectral information associated with the substance may be determined.

Raman spectroscopy is utilised in various applications such as identification of molecules, study of chemical and intramolecular bonds, characterisation of materials, finding crystallographic orientation of a substance, observation of low frequency excitations of a solid, identification of active pharmaceutical ingredients and their polymorphic forms, and so forth. Generally, routine analysis for basic substance identification requires low or medium resolution. In contrast, characterisation of polymorphs and crystallinity often requires high spectral resolution, since these phenomena exhibit subtle changes in the Raman spectrum, that are not visible in a low-resolution Raman spectroscopy. A spectrograph based on angular dispersion enables one to achieve a good spectral resolution while also enabling the measurement of a whole spectrum at the same time. This is a beneficial property of spectrographs as opposed to e.g. scanning monochromators based on e.g. Fabry-Perot filters, rotating gratings and such.

Typically, a fluorescence and background light or target's thermal emissions present when measuring Raman spectrum lead to loss of spectral information, thereby preventing accurate characterisation of the substance. A time-gated Raman spectroscopy technique can improve the measurement. In one type of time-gated Raman spectroscopy a sensor array operates in an ON-state only for a specified period of time to measure the Raman scattering. On the other hand, the sensor array remains in an OFF-state when other phenomena than Raman scattering are observed. As an example, fluorescence can have a long lifetime in comparison to Raman scattering and thus time-gated Raman spectroscopy can be used to reject even a very large fraction of fluorescence emission, and therefore mitigate signal distortions related to it. However, time-gated Raman spectroscopy is associated with its own drawbacks.

Notably, when a target is excited using a short laser pulse having e.g. 100 picosecond temporal width, the emitted Raman-scattered pulse has approximately the same temporal width, assuming the target is optically thin and does not cause temporal broadening by e.g. elastic diffusion. Therefore ideally, the ON-state of the sensor array would be of the same duration. The spectrometers relevant to the present disclosure use angular dispersion to form a spectrum on the sensor array. The angular dispersion in a high-throughput spectrograph leads to excess temporal broadening of the received optical emission pulse. It is noted that certain degree of temporal broadening is inevitable when spectrally resolving a polychromatic optical beam, but the simultaneous demand for high throughput (large optical etendue) also leads to what is called excess temporal broadening in the present disclosure. It is noted that in some time-gating methods the time-gating of the optical pulse is performed before said pulse enters the spectrometer. In those methods, the temporal broadening caused by the spectrometer is not an issue. The present disclosure only concerns those methods of time-gated spectroscopy where the time-gating is performed on the optical pulse after it exits the spectrograph. In these systems, excess temporal broadening leads to a decrease of temporal resolution, which in and of itself is detrimental to many applications of time-resolved spectroscopy. Especially, this entails a decreased effectiveness of time-gating and therefore a decreased signal-to-noise ratio of the time-gated Raman spectrum, as compared to the case where the excess temporal broadening has been completely avoided.

The problem in the prior art is that temporal broadening is increased and signal-to-noise ratio is decreased, which deteriorates effectiveness of measuring time-gated Raman spectrum. Therefore, there exists a need to overcome the problem of excess temporal broadening and reduced signal-to-noise ratio present in such methods of time-gated Raman spectroscopy that use angular dispersion and where the time-gating is performed by or at the detecting element.

SUMMARY

The present disclosure seeks to provide an apparatus for measuring time-resolved optical emission spectrum. The present disclosure also seeks to provide a method for measuring time-resolved optical emission spectrum. The present disclosure seeks to provide a solution to the existing problem of decreased temporal resolution in high-throughput spectrographs when applied to time-resolved optical spectroscopy. An aim of the present disclosure is to provide a solution that overcomes at least partially the problems encountered in prior art, and provides an apparatus for efficiently measuring time-resolved optical spectrum.

In one aspect, an embodiment of the present disclosure provides an apparatus for measuring time-gated Raman spectrum, the apparatus comprising:
  a light source for generating a pulse of light towards a target, wherein the target will subsequently emit an optical radiation comprising at least a first portion and a second portion;
  a sensor arrangement for measuring the intensity of the optical radiation; and
  a controller operatively coupled to the light source and the sensor arrangement;
wherein the sensor arrangement comprises:
  at least one optical delay element to provide a time delay to the first portion of the emitted optical radiation, wherein the second portion of the emitted optical radiation bypasses the at least one optical delay element;
  an optical spectral disperser to disperse the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and a sensor element configured to receive each wavelength of the dispersed radiation on a different spatial region thereof, and to measure light intensity associated with each wavelength of the dispersed radiation;

and wherein the controller is operable to record the measured light intensity associated with each wavelength of the dispersed radiation measured by the sensor element to form a time-resolved optical spectrum.

In another aspect, the present disclosure provides a method for measuring time-resolved optical spectrum, wherein the method comprises:

generating a pulse of light towards a target, wherein the target will subsequently emit an optical radiation comprising at least a first portion and a second portion;

providing a time delay to the first portion of the emitted optical radiation, wherein the second portion of the emitted optical radiation bypasses the at least one optical delay element;

dispersing the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and receiving each wavelength of the dispersed radiation on a different spatial region thereof, and measuring the light intensity associated with each wavelength of the dispersed radiation;

recording the measured light intensity associated with each wavelength of the dispersed radiation measured by the sensor element to form a time-resolved optical spectrum.

Embodiments of the present disclosure substantially eliminate or at least partially address the aforementioned problem of excess temporal broadening in the prior art, and provide an apparatus and a method for measuring time resolved optical spectrum. Such an apparatus employs optical delay elements to manipulate the beam of optical radiation in ways that enhance the time-resolved optical spectrum measurement. Therefore, the present disclosure provides the apparatus for measuring the time-resolved optical spectrum. Furthermore, the present disclosure provides improvements to measurement of a time-gated Raman spectrum that is efficient, accurate and provides an enhanced time resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
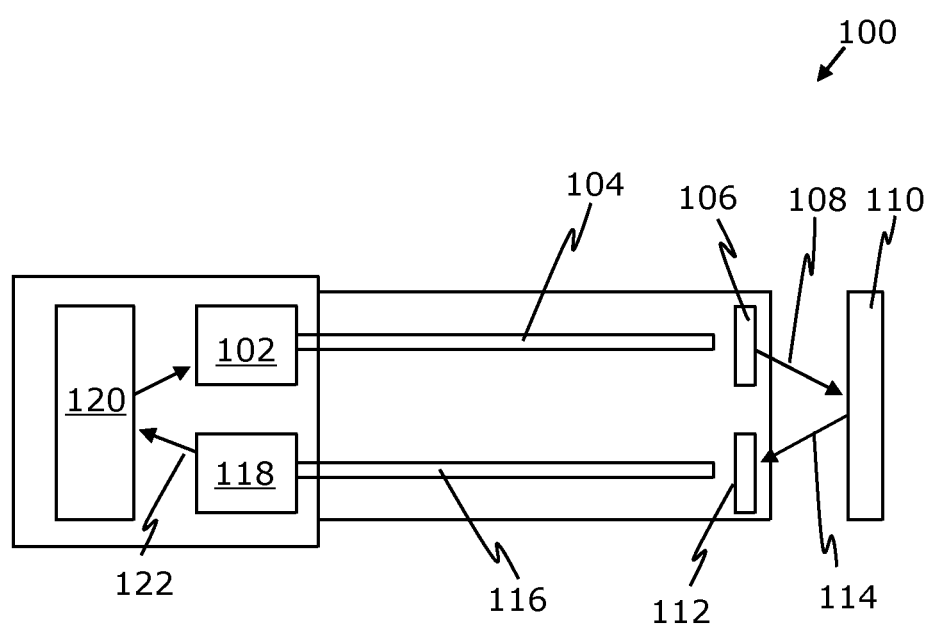
FIG. 1 is a block diagram of an apparatus for measuring time-resolved optical spectrum, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In one aspect, an embodiment of the present disclosure provides an apparatus for measuring time-resolved optical spectrum, the apparatus comprising:

a light source for generating a pulse of light towards a target, wherein the target will subsequently emit an optical radiation;

a sensor arrangement for measuring the intensity of the optical radiation; and a controller operatively coupled to the light source and the sensor arrangement;

wherein the sensor arrangement comprises:

at least one optical delay element to provide a time delay to a first portion of the emitted optical radiation, wherein the emitted optical radiation further comprises a second portion which bypasses the at least one optical delay element;

an optical spectral disperser to disperse the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and a sensor element configured to receive each wavelength of the dispersed radiation on a different spatial region thereof, and to measure light intensity associated with each wavelength of the dispersed radiation;

and wherein the controller is operable to record the measured light intensity associated with each wavelength of the dispersed radiation measured by the sensor element to form a time-resolved optical spectrum.

In another aspect present disclosure provides a method for measuring time-resolved optical spectrum, wherein the method comprises:

generating a pulse of light towards a target, wherein the target will subsequently emit an optical radiation;

providing a time delay to a first portion of the emitted optical radiation, wherein the emitted optical radiation further comprises a second portion which bypasses the at least one optical delay element;

dispersing the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and receiving each wavelength of the dispersed radiation on a different spatial region thereof, and measuring the light intensity associated with each wavelength of the dispersed radiation;

recording the measured light intensity associated with each wavelength of the dispersed radiation measured by the sensor element to form a time-resolved optical spectrum Throughout the present disclosure, the term "target" refers to materials that may emit optical radiation, including but not limited to Raman-scattered light, when illuminated with light, such as a laser light. Practically all materials may emit light by Raman scattering when illuminated with light, e.g. when the material comprises molecules and/or a crystal structure that has vibrational energy levels. Some molecules may emit light by fluorescence in addition to emitting light by the Raman scattering. For example, organic molecules may emit light by fluorescence and by Raman scattering when illuminated by light. For example, organic molecules containing conjugated aromatic rings may emit light by fluorescence and by Raman scattering. It will be appreciated that the fluorescence may disturb measurement of the Raman spectrum, and therefore decrease the quality (such as signal to noise ratio) of the obtained Raman spectrum. Such fluorescence may be reduced or eliminated with a use of time-gated Raman spectroscopy. The form of time-gated Raman spectroscopy related to the present disclosure employs time-resolving detectors (such as the sensor elements) that are configured to remain in an "ON-state" for a short duration of time for the measurement of the dispersed radiation falling thereupon, whereas they are configured to remain in an "OFF-state" for a duration of time during which mostly fluorescence or other non-Raman optical emission is observed. Notably, the emission of light by fluorescence is typically a long-lifetime process when compared with emission of the Raman radiation. Therefore, the "ON-state" associated with the sensor elements is ideally equal to the temporal width of the laser pulse, e.g. 100 picoseconds (ps) during which the Raman radiation is observed. Such an apparatus employing the time-gated Raman spectroscopy eliminates part of the effect of fluorescence (particularly the tail part of the fluorescence).

Raman scattering typically comprises two types of radiations, Stokes Raman scattering and Anti-Stokes Raman scattering. The Stokes Raman scattering is an inelastic scattering process where a photon of illuminating light, such as the laser light may lose energy into a change of vibrational and/or rotational state of the target, i.e. a difference between the energy of the incident photon and the energy of the corresponding scattered photon is positive. The photon of the illuminating light may lose energy into a change of the vibrational state and into a change of the rotational state of the target. The Anti-Stokes Raman scattering is an inelastic scattering process where a scattered photon may gain energy from a change of the vibrational state of the target, i.e. a difference between the energy of the incident photon and the energy of the corresponding scattered photon is negative. The photon of the scattered light may gain energy from a change of the vibrational state and from a change of the rotational state of the target. The time-gated Raman spectrum of the target may be used for example, for providing information about a molecular composition of the target. The information may be used for example, for qualitative chemical analysis of the target, for quantitative chemical analysis of the target, and/or for analysing a crystal structure of the target. Moreover, an industrial process may be controlled based on the information. The information may be used for example, for a forensic purpose, such as it may be used as an evidence in court.

The apparatus for measuring the time-resolved optical spectrum comprises the light source for generating the pulse of light towards the target (also known as an excitation pulse). An example of the light source is a laser. Indeed, the apparatus for measuring the time-resolved optical spectrum may utilise an intense monochromatic source of light, such as the laser source to generate the pulse of light. The light source is employed to emit the pulse of light preferably in a visible range, an ultraviolet range or near-infrared region of electromagnetic spectrum of light. Optionally, the light source may be a laser diode, a solid-state laser and the like. More optionally, the light source may be a Q-switched laser that enables emission of short pulses of light towards the target. Moreover, the target scatters will subsequently (after the (excitation) pulse of light hits the target) emit an optical radiation. Part of the optical radiation which is emitted can be in form of Raman radiation. The pulse of light may be arranged to illuminate the target, such as to cause inelastic scattering of photons from the target. In particular, the part of the pulse of light may get excited as the Raman scattering from the target. Furthermore, the pulse of light might result to Fluorescence radiation to be emitted as an optical radiation from the target. The target may comprise for example, an inorganic material. The target may comprise for example, an organic material and/or biological material. The target may comprise for example, aromatic compounds, that may emit light by the Raman scattering and by fluorescence. The target may comprise for example, a gas, a solid and/or a liquid. The target may comprise for example, a heterogeneous mixture. The target may comprise for example, a heterogeneous mixture, that comprises particles suspended in a liquid or suspended in a gas. The particles may be for example, solid particles, liquid particles and/or biological cells. The target may comprise for example, a single crystal, polycrystalline material or amorphous material. The target may be supported for example, on a holder. The target may be contained for example, in a sample cell. The emitted optical radiation may include the Raman scattered light and/or elastically scattered light. The elastically scattered light may include Rayleigh-scattered light from a homogeneous substance. The elastically scattered light may include Mie-scattered light from particles of the target. The elastically scattered light may include the Rayleigh-scattered light from a suspending medium and/or the Mie-scattered light from one or more particles. The elastically scattered and reflected light may include Fresnel-reflected light from various boundaries between media with different refractive indices in the target, the sample cell and all intervening parts within the optical path. The target may provide elastically scattered light (as emitted optical radiation) when illuminated by the pulse of light, and the material may provide the Raman scattered light (as emitted optical radiation) when illuminated by the pulse of light. A wavelength of the elastically scattered light may be equal to a wavelength of the pulse of light.

Optionally, the apparatus for measuring time-resolved optical spectrum further comprises at least one optical member to gather the generated pulse of light from the light source and to focus the generated pulse of light towards the target. The at least one optical member may be for example, an optical lens that gathers the pulse of light from the light source and focus the pulse of light towards the target. More optionally, the at least one optical member may be a beam splitter to guide a part of the pulse of light to a synchronization sensor element such as single reverse-biased photodiode and guide other part of the pulse of light towards the target. The synchronization sensor element may generate a synchronisation signal for controlling a timing of operation of the sensor element for the time-resolved optical spectroscopy. The synchronisation signal may also be called for example, a timing signal. The synchronisation signal may comprise a timing pulse. The synchronisation signal may be called a timing pulse.

Moreover, the apparatus for measuring the time-resolved optical spectrum comprises the sensor arrangement for measuring the time-resolved optical radiation spectrum. The sensor arrangement processes the measured optical radiation to obtain the time-resolved optical spectrum and consequently measure time-resolved optical spectrum.

Furthermore, the apparatus for measuring the time-resolved optical spectrum comprises the controller operatively coupled to the light source and the sensor arrangement. Throughout the present disclosure, the term "controller" refers to a hardware device or a software that manages, commands, directs, or regulates operation of other devices or systems, such as the light source and the sensor arrangement. The controller may comprise auxiliary devices such as a clock, an auxiliary trigger device and so forth. For example, the controller may be implemented via microcontrollers, programmable logic controllers and so forth. The controller operatively coupled to the light source enables generation of a pulse of light by the light source according to a trigger signal provided by the controller. For example, the trigger signal may be generated by the clock, or by the auxiliary trigger device. The controller, the clock, or the auxiliary trigger device may be arranged to send the trigger signal to the light source, such as to trigger generation of a pulse of light on demand. The light source may be arranged to generate a sequence of pulse of light according to the trigger signal. A repetition rate of the pulse of light may be for example, in a range of 1 Hz to 107 Hz. Optionally, the repetition rate of the pulse of light may be from 1, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000 or 9000000 Hz up to 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000 or 10000000 Hz. Preferably, the repetition rate of the pulse of light may be for example, in a range of 10 kHz to 1000 KHz. Optionally, the repetition rate of the pulse of light may be from 10, 100, 200, 300, 400, 500, 600, 700, 800, 900 KHz up to 100, 200, 300, 400, 500, 600, 700, 800, 900 or 1000 KHz. The light source may be arranged to generate a single pulse of light. An operating lifetime of the light source may depend on a maximum intensity of the pulse of light and also on a temporal width of the pulse of light. Moreover, generation of short and intense pulse of light may be associated with a risk of damaging a critical component of the light source or any auxiliary equipment associated with the light source such as a focal lens. The light source may be arranged to provide the pulses of light such that the temporal width of the pulses of light is greater than a predetermined limit in a situation where the maximum intensity of the pulses of light is in a predetermined range, such as to provide a certain minimum operating lifetime for the light source.

The temporal width of the pulses of light may be for example, in a range of 10 to 2000 ps (picoseconds). Indeed, when the light pulse is longer than for example 2000 ps, typically optical delay elements are not needed. The temporal width of the pulses of light may be for example, longer than or equal to 50 ps in order to reduce risk of damaging the light source and the auxiliary equipment associated therewith.

Optionally the sensor arrangement further comprises at least one collimating element to collimate the emitted optical radiation from the target. The emitted optical radiation from the target is in a scattered form, therefore, the optical radiation emitted from the target initially possesses a spherical wave front. The at least one collimating element to collimate the optical radiation emitted from the target can be arranged on the optical path between the target and the at least one delay element. In such an example collimated beam of optical radiation is provided towards delay element (s). Alternatively, the at least one collimating element to collimate the emitted optical radiation from the target can be arranged on an optical path between the at least one delay element and the sensor element.

Optionally, the at least one collimating element comprises for example at least one of a lens arrangement, a mirror arrangement, an aperture incorporated via a pinhole or a slit, or an optical waveguide. The collimating element may be a lens, such as a convex lens that collimates the optical radiation emitted by the target having the spherical wave front into an emitted optical radiation having a planar wavefront.

The sensor arrangement further comprises at least one optical delay element to provide the time delay to the first portion of the emitted optical radiation. Moreover, the emitted optical radiation further comprises a second portion which bypasses the at least one optical delay element. As mentioned above, the emitted optical radiation having passed through the collimating element possesses a planar wave front. The optical delay element is provided in an optical path of the first portion of such emitted optical radiation. According to an embodiment, at least the first portion of the emitted optical radiation is arranged to pass multiple times through at least one optical delay element. In a first example the first portion of the emitted optical radiation is passed through the optical delay element which slows down the first portion as compared to the second portion which bypasses the optical delay element. In a second example the first portion of the emitted optical radiation is arranged to travel a longer optical path than the second portion. In a third example a combination of optical delay to slow down and longer optical paths can be used. Overall and therefore, a time taken by the first portion to travel after exiting the optical delay element is more than a time taken by the second portion which bypasses the optical delay element. It will be appreciated that, the first portion may further be divided into a plurality of portions, such that each portion of the plurality of portions is provided with a different number or size of optical delay elements in order to provide different time delay to each portion of the plurality of portions. Moreover, the optical delay elements in each portion may be of different shapes and sizes in order to provide different time delay to each portion. Furthermore, the optical delay element in each portion may be made of different materials, such that a speed of the optical radiation passing through each optical delay element is different, thereby providing a different time delay to each portion of the plurality of portions. Furthermore, the term "bypasses", in context of bypasses at least one optical delay element, refers to a portion of the emitted optical radiation, which does not go thru the at least one optical delay element. Said second portion which bypasses the at least one optical delay element can be arranged to go thru another optical delay element than the at least one optical delay element. I.e. there can be different delays arranged for the first portion and the second portion. Number of portions in present disclosure can be two or more. Furthermore, as an example the optical delay element that, when in operation, provides a time delay to the first portion of the emitted optical radiation having a shorter optical path than the second portion of the emitted optical radiation. Moreover, the optical path of the second portion of the emitted optical radiation is devoid of the optical delay element, thereby allowing the second portion to travel without any time delay. Therefore, the delayed first portion and the second portion exit the optical spectral disperser in form of the dispersed radiation travelling with predetermined relative time delays. Consequently, the plurality of wavelengths of the dispersed radiation are received by the sensor element in controlled manner (such as different time or a same time), thereby, allowing the sensor element to measure the light intensity associated with each wavelength of the plurality of wavelengths accurately within a short period of time during the "ON-state" thereof, such as a few tens of picoseconds. Such optical delay element enhances the temporal resolution associated with the time-resolved optical spectroscopy. Furthermore, it will be appreciated that temporal broadening due to light-pulse front tilt associated with the dispersed radiation deteriorate the fluorescence rejection of the time-gated Raman spectroscopy. Therefore, the optical delay element, the sensor element and the optical spectral disperser utilising angular spectral dispersion improves temporal resolution while not affecting negatively the spectral resolution associated with the time-gated Raman spectroscopy.

To overcome the problem of excess temporal broadening and reduced signal-to-noise ratio for measuring time-gated Raman spectrum at least one optical delay element is used, which provides time delay to the first portion of the emitted optical radiation and where the second portion bypasses the at least one optical delay element, allowing the plurality of wavelengths to be received by the sensor element in controlled manner within a short period of time. The first portion of the emitted optical radiation is passed through the optical delay element which delays the first portion as compared to the second portion which bypasses the optical delay element and therefore, a time taken by the first portion to travel after exiting the optical delay element is more than the time taken by the second portion which bypasses the optical delay element. The delay of the first portion can be adjusted to be such that it cancels the average delay between the first portion and the second portion caused by the pulse front tilt created by angular dispersion in the spectrograph. The plurality of wavelengths will be received by the sensor element in controlled manner, thereby, allowing the sensor element to measure the light intensity of the plurality of wavelengths accurately within a short period of time. Fluorescence has a long lifetime in comparison to Raman scattering and thus measuring the light intensity for a short period of time rejects very large fraction of fluorescence emission and therefore enhances signal-to-noise ratio.

Optionally, the at least one optical delay element is at least one of a length of free space, a prism made of glass, a cuboid made of glass, a Dove prism made of glass, a penta prism made of glass, a prism made of crystal material, a cuboid made of crystal material, a Dove prism made of crystal material, a penta prism made of crystal material, a mirror arrangement, a lens, an optical fibre. The optical delay element can be a length of free space which a portion of the emitted optical radiation travels. If the length is longer the delay is longer. The optical delay element may be a glass that is a transparent block of glass, such that the glass allows the emitted optical radiation to pass therethrough. The optical delay element may be an optical lens, such that the wave front of the optical radiation remains unchanged when passed through the lens. It will be appreciated that the first portion of the emitted optical radiation may be passed through a plurality of optical delay elements. In an example, the first portion may be passed through the glass and the lens. In another example, the first portion may be passed through the lens, the crystal and the optical fibre. Notably, increasing the number of optical delay elements in the optical path of the first portion, increases the time delay associated therewith. In further optional embodiment the optical delay element can be a mirror arrangement. The mirror arrangement can comprise one or more plane mirrors. Alternatively or additionally, the mirror arrangement can comprise one or more non-planar mirrors. In such mirror arrangement optical delay is provided by arranging the first portion of the non-collimated emitted optical radiation to travel a longer path than the second portion of the non-collimated emitted optical radiation. In general mirror arrangement can be configured to provide equivalent effect compared to using a Dove prism of a penta prism. In additional embodiment at least the first portion of the emitted optical radiation can be passed multiple times through at least one optical delay element. This way a single optical delay element can be used to multiply the delay depending on number of times the emitted optical radiation passes thru the at least one optical delay element. In alternative embodiment the second portion does not go thru an optical delay element. If further alternative embodiment the second portion goes thru another optical delay element which provides different delay than the at least one optical delay element.

In further optional or alternative embodiment, the optical delay element is arranged using catadioptric segmentation. The arrangement comprises glass elements and mirror elements. In such an arrangement the emitted optical radiation is arranged to make multiple passes (dual pass, quadruple pass etc) through blocks of glass. As an example, a first portion of the emitted optical radiation is configured to pass through a first glass element and a second portion of the emitted optical radiation is configured to pass through a second glass element with an angle. The first glass element being thicker than the second. After passing through the first or second glass elements the portions of the emitted optical radiation are reflected back to go through the glass elements again using a first mirror. This way a delay caused by a glass element can be increased without adding additional glass elements (light is passed twice through of a glass element). If the emitted optical radiation is arranged to have an angle in respect to glass blocks and to the first mirror the first portion and the second portion are shifted from each other (enlarging the total pupil width). Furthermore, the reflected and delayed portions of the emitted optical radiation can be further reflected back with a second mirror to the glass elements for additional delay and also to compensate for shifting of the first portion in respect to another portion. The compensation can be done as the first mirror and second mirror are arranged in different angles in relation to the glass blocks.

Yet in further optional arrangement the optical delay elements can be arranged with a mirror arrangement comprising a first spherical mirror with radius of curvature of r1 and a second spherical mirror with radius of curvature of $r2=r1/2$ wherein both spherical mirrors have a common centre of curvature. This arrangement enables to eliminate need for collimating elements i.e. use of uncollimated emitted optical radiation for the sensor arrangement. Since in the arrangement both of the spherical mirrors have a common centre of curvature, both spherical mirrors form an image of input beam to a same output position. The input beam for the arrangement is a focused emitted optical radiation beam and output is again a focused optical beam of emitted optical radiation, to be directed to an optical spectral disperser (as described later) of the sensor arrangement. This way a first part of the input beam, which is reflected from the first spherical mirror, acquires an optical pathlength of 2r1 from input to output and a second part of the input beam, which is reflected from the second spherical mirror, acquires an optical path length of $2r2=r1$ from the input to the output. Indeed, if concave grating is used, a segmented spectrograph can be implemented with uncollimated beam throughout.

The sensor arrangement further comprises the optical spectral disperser to disperse the delayed first portion and the second portion of the emitted optical radiation into the dispersed radiation having the plurality of wavelengths. Moreover, each wavelength of the dispersed radiation is split into an angularly separate direction, wherein each wavelength of the dispersed radiation is split into an angularly separate direction, and wherein the dispersed radiation of each portion exits the optical spectral disperser with predetermined relative delays.

The optical spectral disperser refracts and disperses the emitted optical radiation passed therethrough such that the delayed first portion and the second portion of the emitted optical radiation splits into the dispersed radiation having the plurality of wavelengths. Therefore, each wavelength of the dispersed radiation is split into the spatially separate direction. The optical delay element provides the time delay to the first portion emitted radiation, such that the delayed first portion and the second portion when passed through the optical spectral disperser exits the optical spectral disperser in the form of the dispersed radiation with predetermine relative delays. As an example: At least one delay element is a cuboid made of glass with thickness of 5 cm and refractive index of 1.5 (in direction of travel of the first portion of the emitted light). The first portion of the emitted radiation is arranged to travel thru the cuboid made of glass and the second portion is arranged to bypass the at least one delay element and travel over air the same distance. The first portion travels 5 cm with speed c/1.5 and the second portion with speed c (wherein c is speed of light). i.e. the first portion is delayed with time of $5\ cm/(c/1.5) - 5\ cm/c = 8.3 \times 10^{-11}$ s (83 ps) in relative to the second portion.

Optionally, the apparatus for measuring the time-resolved spectrum further comprises a first optical fibre to direct the generated pulse of light from the light source towards the target and a second optical fibre to direct the emitted optical radiation from the target to the optical spectral disperser. The first optical fibre is provided in an optical path between the generated pulse of light and the target in order to minimise a loss of light. Optionally, the second optical fibre may be provided to provide an optical path to the emitted optical radiation to enter the at least one collimating element.

Optionally, the optical spectral disperser comprises at least one of a diffraction grating, a prism or a Fabry-Perot etalon. The pulse front tilt associated with the dispersed radiation is same in both the diffraction grating and the prism and the etalon, if the angular dispersion of the dispersed radiation is same for both the diffraction grating and the prism and the etalon. However, nature of the pulse front tilt differs for the diffraction grating and the prism. In case of the prism employed as the optical spectral disperser, phase front of each wavelength of the dispersed radiation remains perpendicular thereof, whereas wave packets associated with each wavelength of the dispersed radiation acquire different amounts of group delay depending on an optical path length thereof inside the prism. In case of the diffraction grating employed as the optical spectral disperser, the phase front of each wavelength of the dispersed radiation become tilted relative to a cross section thereof.

More optionally, for a polychromatic optical beam, monochromatic components, such as a plurality of wavelengths associated therewith may acquire a lateral shift and a positive or negative chirp therebetween. In an example, the prism employed as the optical delay element may be a dove prism, a penta prism and so forth. Notably, the dove prism provides a lateral chromatic shift and an upside-down flip, but zero angular dispersion and pulse front tilt. The penta prism also provides no angular dispersion or pulse front tilt, but it turns the beam to one side by 90 degrees, while the different wavelength components acquire a lateral shift.

Below, the trade-offs between pulse front tilt and spectral resolution are described in detail for the case of spectrometers built using planar diffraction gratings. The cases of spectrograph designs involving concave diffraction gratings, prisms and etalons are similar with the planar-grating case for the purposes of the present disclosure.

A selection of a type of grating used as the diffraction grating employed as the optical spectral disperser is an important aspect. A diffraction order of the diffraction grating is denoted by an integer 'm', such that typically, |m|=1.

A total number of lines in the diffraction grating is denoted by 'N'. The diffraction grating is assumed to be completely filled by the collimated emitted optical radiation having the delayed first portion and the second portion.

Line spacing between the gratings of the diffraction grating is denoted by 'd' (millimetres). Thus, line density (i.e. the lines per millimetre (1/mm))=1/d.

Total width (w) of the diffraction grating is denoted by:

$$w=Nd$$

Resolving power (R) of the diffraction grating is denoted by:

$$R=\lambda/\Delta\lambda=|m|N$$

where $\lambda$ is the wavelength.

The maximum possible resolving power ($R_{max}$) of the diffraction grating having the width (w) is:

$$R_{max}=2w/\lambda$$

The pulse front tilt due to the diffraction grating may be characterised either in spatial terms or temporal terms. Spatially, the pulse front tilt is equal to the total number of lines in the diffraction grating multiplied by the diffraction order multiplied by the wavelength, i.e. equal to $R\lambda$. The temporal pulse front tilt, which is the same as the total temporal broadening of a delta pulse, is equal to the spatial tilt divided by the speed of light=$R\lambda/c$, where c is the speed of light.

The Angular dispersion $(d\theta)/(d\lambda)$ associated with the dispersed radiation is denoted by:

$$(d\theta)/(d\lambda)=(1/\cos\theta)(m/d)$$

where $\theta$ is the diffraction angle.

The incident angle is a constant $\theta_0$. Notably, the angular dispersion increases as the line spacing of the diffraction grating (d) decreases. Moreover, the diffraction efficiency of the diffraction grating of the diffraction order 'm' is a function of the wavelength. The free spectral range is dependent on the wavelength range and the diffraction order. Notably, in case |m|=1, the free spectral range for wavelengths of visible range of the electromagnetic spectrum covers the whole range. Therefore, order sorting filters are not required for the first order. The diffraction pattern resulting from a truly collimated optical beam of emitted optical radiation having the delayed first portion and the second portion on the diffraction grating is a sinc² function of the angle. It will be appreciated that, greater the resolving power, the narrower the central maximum of the pattern. The angular resolving power may be estimated using the angular dispersion and resolving power.

Notably, $\Delta\theta \approx (d\theta)/(d\lambda)\Delta\lambda$ and $\Delta\lambda=\lambda/R=\lambda/|m|N$ Therefore, $|\Delta\theta|\approx\lambda/(N\cos\theta)$.

Furthermore, if the full spectral resolving power of the diffraction grating is to be utilised, the slit (such as the aperture incorporated via the slit) is required to be narrow. Specifically, the width of the slit would have to be such that the whole diffraction grating is able to fit within the central maximum of Fraunhofer diffraction pattern of the slit. Typically, the slit is much wider than this, to increase the optical throughput. Thus, the monochromatic beam (such as the pulse of light) filling the slit is transformed by the collimating element into a wide beam with small but finite angular spread denoted by $\delta\theta$. Let $w_1$ be the input slit width and $F_c$ the collimator focal length.

$$\tan(\delta\theta/2)=w_1/(2F_c)$$

if $w_1<<F_c$, $$\delta\theta \approx w_1/F_c$$

where $w_1$ is width of the slit and $F_c$ is focal length of the collimating element.

It will be appreciated that an image of the slit on the spectral plane is one of the major factors that determine the optical spectral resolution, assuming that the diffraction pattern (i.e. the sinc² function) is still narrower than the image of the slit. The image of the slit of the monochromatic beam is approximately a convolution of the diffraction pattern with a boxcar function, the latter representing the slit image when perfect imaging quality is assumed. In real spectrometers the imaging quality is not perfect, and the final input slit image on the detector is furthermore blurred by the system's point spread function.

It will be appreciated that to attain large enough angular dispersion of the dispersed radiation, the grating constant must be small. Moreover, to attain enough throughput, width of the diffraction grating must be large. Therefore, the resolving power of the diffraction grating is typically better than a final optical resolution defined by the width of image of the slit.

Thus, $R=|m|N=|m|(w/d)$ becomes large.

On the other hand, assuming infinitely narrow slit width, the minimum resolving power (R) needed to attain a given resolution $\Delta\lambda_0$ at a given wavelength $\lambda_0$ may be calculated. As shown, the resolving power $R=|m|N=\lambda/\Delta\lambda$, Thus, $R_{eq}=\lambda_0/(\Delta\lambda_0)$ where, $\Delta\lambda_0$ is the slit-limited resolution.

If the sinc² pattern is at least 3 times narrower than image of the slit, the latter dominates the resolution. The minimum equivalent grating resolving power to achieve the above-mentioned resolution is:

$$R'_{eq}=(3\lambda_0)/(\Delta\lambda_0)$$

The ratio between the minimum resolving power and the actual resolving power is defined as excess resolving power, namely:

$$E_R=R/R'_{eq}=(|m|N\Delta\lambda_0)/(3\lambda_0)$$

Furthermore, the optical path difference over the whole diffraction grating is defined as $\Delta s=R\lambda$, and correspondingly the minimum equivalent path difference is defined as $\Delta s'_{eq}=R'_{eq}\lambda$. The excess path difference is defined as $\Delta s=E_R\Delta s'_{eq}$ and excess temporal broadening may be defined as $\Delta t=E_R\Delta t'_{eq}$. Notably, if the excess temporal broadening factor $E_R>1$, the temporal pulse broadening is larger than absolutely required for the targeted wavelength resolution.

Since, $\Delta k=\Delta\lambda/\lambda^2$, where $\Delta k$ is the wavenumber resolution.

Therefore, due to uncertainty relation based on mathematics of Fourier transforms, $\Delta s=1/\Delta k$ and $\Delta s\Delta k=1$. The temporal broadening caused by a Fourier transform spectrometer and a spectrometer based on angular diffraction or dispersion may be compared based on the above equations. In the Fourier transform spectrometer with perfectly collimated beam (such as the pulses of light), the wavenumber resolution ($\Delta k$) leads to pulse broadening $\Delta t=\Delta s/c=1/c\Delta k$, which means it has no excess temporal broadening.

Optionally, the collimated emitted optical radiation received from the target is configured to be directed towards the sensor element through the optical spectral disperser employing the diffraction grating using at least one of a light-transmission segmentation, a light-reflection segmentation or a light-splitting segmentation. Indeed, according to an embodiment, the optical spectral disperser comprises a diffraction grating, and the delayed first portion and the second portion of the emitted optical radiation is configured to be directed towards the sensor element through the optical spectral disperser employing the diffraction grating using at least one of: light-transmission segmentation, light-reflection segmentation, light-splitting segmentation. The basic requirements of a compact time-gated Raman spectrograph for low-light applications are large aperture and large angular dispersion. Such requirements may lead to large excess resolving power ($E_R$) and therefore excess pulse front tilt. However, in order to maintain the large aperture, the excess resolving power provided by the diffraction grating may be utilised. The original large grating of the diffraction grating may be divided into segments with smaller but sufficient number of grating lines. Further, each such segment may be fed with a slice of the original monochromatic beam with a suitable relative optical path difference.

It will be appreciated that the optical path lengths for the collimated emitted optical radiation (such as the first portion of the collimated emitted radiation) entering an inner side of the optical spectral disperser employing the diffraction grating is shorter than that of the collimated emitted radiation (such as the second portion of the collimated emitted radiation) entering the outer side of the diffraction grating. In light-transmission segmentation, for balancing the optical path length difference, optical delay elements (such as blocks of glass) are added into the optical path of the first portion. Notably, the temporal broadening is related to the pulse front tilt. Thus, the pulse front tilt is $R\lambda$ in absence of the optical delay element. In an example, the first portion of the collimated emitted radiation having the optical delay element is twice as wide as the second portion. In such an example, the diffraction grating segment corresponding to the second portion has one-third of the grating lines. Furthermore, the first portion is divided into two portions such that each portion of the first portion has one-third of the diffraction lines. Therefore, the pulse front tilt associated with each portion (i.e. two portions of the first portion and the second portion) is $R\lambda/3$. The optical thickness of the optical delay element is selected in a manner such that the tilted pulse fronts of each sub-portion of the first portion and the second portion exit the optical spectral disperser travelling in unison after dispersion. Such an arrangement enables reduction in the temporal broadening by the factor of three. Moreover, the spectral resolution remains undeteriorated by the segmentation, assuming the obtained resolving power R/3 is still larger than the resolution given by the slit width. More optionally, the dove prism may be used as the optical delay element. An equivalent of the dove prism comprising mirrors may be used that gives an additional advantage of elimination of chromatic effects that may be experienced with dove prism. Yet more optionally, the penta prism may be used as the optical delay element. An advantage of using the light-transmission segmentation is that the optical delay elements may easily be removed from the optical path of the first portion of the collimated beam when good temporal resolution is not required and spectrometer cost and complexity must be reduced.

The light-reflection segmentation may be used to direct the collimated emitted radiation towards the sensor element through the diffraction grating. Such an arrangement comprising the light-reflection segmentation has an advantage that no chromatic effects such as the group velocity dispersion or wavelength-dependent lateral shifts are observed.

The light-splitting segmentation is a type of the light-reflection segmentation that comprise usage of more than one detector (such as the sensor element) and more than one optical spectral disperser. The light-splitting segmentation comprise various segmentation designs based on a placement of beam reflectors (such as mirrors), that reflect the optical beam (of emitted optical radiation) in a desired direction of each of the optical spectral disperser to receive the optical beam (of emitted optical radiation) and disperse the received (polychromatic) emitted optical radiation (in essence a beam of emitted optical radiation) into the dispersed radiation having the plurality of wavelengths propagating into different angles. In an example, the light-splitting segmentation used by the diffraction grating comprise a first order "spruce" design such that the collimated emitted optical radiation is split into two directions, referred to as the two branches of a spruce. In such an example, the temporal broadening is halved, whereas the wavelength resolution is intact. In another example, the light-splitting segmentation used by the diffraction grating comprise a second order "spruce" design such that the collimated optical radiation is split into four beams. In such an example, the temporal broadening reduces by a factor of four, whereas the wavelength resolution is intact. In yet another example, the light-splitting segmentation used by the diffraction grating comprise an "oak" design that is a recursive generalisation of the first order "spruce" design. Indeed, the optical spectral disperser is configured to disperse the delayed first portion and the second portion of the emitted optical radiation into a dispersed radiation having a plurality of wavelengths, wherein each wavelength of the dispersed radiation is split into an angularly separate direction.

The sensor arrangement further comprises the sensor element configured to receive each wavelength of the dispersed radiation on the different spatial region thereof. Moreover, the sensor element is configured to measure the light intensity associated with each wavelength of the dispersed radiation. The optical spectral disperser may split the delayed first portion and the second portion of the emitted collimated optical radiation into the dispersed radiation having the plurality of wavelengths, such that each wavelength corresponds to a spectral component. The optical disperser element may direct the spectral components to different spatial regions of the sensor element. The sensor element is configured to measure the spectral intensity (such as the light intensity) associated with each spectral component at different wavelengths. The potential advantage of the dispersed radiation exiting at a same time from the optical spectral disperser is that a signal to noise ratio associated with the sensor element improves. As an example, the light intensity associated with each wavelength can refer to number of photons received by each of the sensor elements during the time of measurement. The light intensity in general in present disclosure refers to absolute or relative number value which can be used to form a time-resolved optical spectrum. Furthermore the term "each wavelength of the dispersed radiation on different spatial regions" refer to wavelength ranges within the emitted optical radiation towards an angle related to an angular direction. As an example, the wavelength range within a first angle range in direction of a first angular direction can be between a first wavelength and a second wavelength. The difference between the first wavelength and the second wavelength can be for example 0.001 nm, 0.1 nm, 1 nm, 10 nm or 100 nm, depending on the construction of the optical disperser and the geometry of the sensor arrangement. Further, the wavelength ranges within a second angle range in direction of a second angular direction can be between a third wavelength and a fourth wavelength. The difference between the third wavelength and the fourth wavelength can be for example 0.001 nm, 0.1 nm, 1 nm, 10 nm or 100 nm, depending on the construction of the optical disperser and the geometry of the sensor arrangement. As a further example, wavelengths within the first angle in the first angular direction can be from 800 nm up to 801 nm (not including 801 nm) and within the second angle in the second angular direction from 801 nm up to 802 nm. In other words, the difference between two consecutive "each wavelength" ranges can be for example up to 0.001, 0.01, 0.1, 1, 5, 10, 20, 30, 40 or 50 nm. According to the example, a first sensor of the sensor element is thus configured to receive photons related to wavelengths of the first range of wavelengths (from 800 nm up to 801 nm, not including 801 nm). Further, a second sensor of the sensor element is configured to receive photons related to wavelengths of the second range of wavelengths (from 801 nm up to 802 nm). According to the example, the first sensor element and the second sensor element are thus arranged spatially next to each other. The measured photons related to wavelengths of the first range and the second range are used as a measure of light intensity associated with each wavelength of the dispersed radiation (i.e. intensity related to the first range and the second range). Indeed, the sensor element is configured to receive each wavelength of the dispersed radiation on a different spatial region thereof, wherein a first spatial region of the sensor element is configured to receive a first range of wavelengths and a second spatial region of the sensor element is configured to receive a second range of wavelengths in a second spatial region. In one embodiment, the sensor element comprises two or more sensors.

Optionally, the sensor element is configured or operable to be in the "ON-state" for a predetermined period of time when the dispersed radiation is received by the sensor element. Optionally, the predetermined period of time is defined as the amount of time for which the Raman radiation is emitted by the target when the latter is excited by incident laser pulse. Such amount of time is generally less as compared to other photo-generated radiations, such as fluorescence emitted by the target. The other radiations hinder the measurement of the Raman radiation, thus, need to be avoided while measuring the Raman radiation. In an example, the predetermined period of time is 100 ps, which may be equal to the temporal width of the laser pulse which excites the target. The sensor element may be in the "ON-state" for a predetermined period of time of 100 ps, to receive the dispersed radiation associated with the Raman radiation which has been emitted by the target. The sensor element may be in the "OFF-state" for a duration of time during which the other unwanted radiations such as fluorescence are observed. Furthermore, in an example embodiment, the controller synchronises a sensor element of the sensor arrangement with the generated pulses of light. As an example, the controller provides the signal to the sensor element to start the measurement at expected time of arrival of photons associated with Raman spectrum and stop the measurement before the arrival of the trailing fluorescence emission. If for example, distance between the target and laser is 1 meter and distance from the target to the sensor element is 1 metre total time for the pulse of the light to travel from laser to the sensor element is t=2 m/c=6.671 nanoseconds (ns), wherein c=speed of light. Since typically the fluorescence phenomenon has a life time which is longer than that of Raman, turning off the sensor element for example 100 picoseconds after the start time will decrease disturbance from the fluorescence radiation effectively. In this example, the sensor element is in "ON-state" between time period of 6.671 ns to 6.771 ns after start of generating each pulse (a measurement window). Typically, the fluorescence radiation is observed for a few thousand picoseconds, for example, 10000 ps. Thus, the sensor element is configured to be in the "OFF-state" during the time period when fluorescence is observed, such as, 10000 ps. This way photons associated with time period during OFF-state are not measured. In an optional or additional embodiment, the start time of the measurement window after generating a light pulse can be adjusted to generate time-based histogram of the measurement. Using above example of 2 metres, start time might be 6.671 ns, 6.68 ns, 6.69 ns etc. from moment of time the light pulse is generated. Furthermore, the predetermined period of time for "ON-state" can be set depending on the measurement conditions and the sensor element speed and sensitivity. Optionally, the length of the predetermined period of time can be in a range of 1 to 100 ps. In an example, the predetermined period of time may be from 1, 10, 20, 30, 40, 50, 60, 70, 80, 90, 100, 110, 120, 130, 140, 150, 160, 170, 180 or 190 ps up to 10, 20, 30, 40, 50, 60, 70, 80, 90, 100, 110, 120, 130, 140, 150, 160, 170, 180, 190 or 200 ps. The predetermined period of time for "ON-state" can also be for example one to a few nanoseconds, and within this period of time, the time of impact of the photon in the detector can be determined within a resolution of for example 30100 picoseconds, using time-to-digital converters in conjunction with the detecting element. In this case, the predetermined period of time for "ON-state" can be from 1, 2, 3, 4, 5, 6, 7, or 8 nanoseconds up to 3, 4, 5, 6, 7, 8, 9 or 10 nanoseconds.

Optionally, the sensor element further comprises a plurality of pixels on each of the different spatial regions. The plurality of pixels on each of the spatial regions is configured to receive a separate wavelength of the dispersed radiation and measure the amount of light intensity associated with each wavelength of the dispersed radiation. Each pixel of the plurality of pixels of the sensor element may be arranged to measure the spectral intensity of each spectral component at a different wavelength. For example, a first spectral component may be directed to a pixel P1, a second spectral component may be directed to a pixel P2, a third spectral component may be directed to a pixel P3, and so forth. Each pixel of the sensor element may be arranged to measure the light intensity of a spectral component at a different wavelength band. The sensor element may provide a plurality of measured values indicative of the measured light intensities of the spectral components. Each measured value may be indicative of the spectral intensity of the scattered light at a different wavelength. The sensor element may optionally comprise a memory for storing the measured values. The memory may be called for example, as a buffer memory. In particular, the sensor element may comprise for example, an array of single photon avalanche diodes (SPAD). The spectral intensity distribution of the scattered Raman radiation may be measured by using the sensor element comprising the SPAD. Using the SPAD detector may allow for example, reduction in the noise level of the measured values. Optionally, the apparatus may comprise one or more filters to reject unwanted spectral components of the dispersed radiation.

Moreover, the apparatus for measuring the time-gated Raman spectrum comprises the controller operable to collect the amount of light intensity associated with each wavelength of the dispersed radiation measured by the sensor element to form the time-gated Raman spectrum. A timing of operation of the sensor element may be controlled based on the timing signal. The operation of the sensor element may be enabled and disabled based on the timing signal. In particular, a SPAD detector may comprise a set of counters. The operation of said set of counters may be enabled and disabled based on the timing signal. The timing signal may be formed for example, by using in the excitation laser beam a beam splitter and an auxiliary photoelectric detector. The sensor element may provide a detector signal. The detector signal may comprise a plurality of measured optical signal values. Each optical signal value may indicate the spectral intensity of the optical radiation, such as Raman scattered light at different spectral regions. Such optical signal values are used to form the time-gated Raman spectrum, or in general a time-resolved optical spectrum associated with the target.

Furthermore, the apparatus for measuring the time-resolved optical spectrum may comprise a data processing unit for processing the measured values obtained from the sensor element. The apparatus may comprise a memory for storing output values determined from the measured values. The output values may specify a measured time-resolved optical spectrum of the target. The data processing unit may be configured to determine the measured time-resolved optical spectrum or in general a time-resolved optical emission spectrum from measured values obtained from the sensor element.

The apparatus may comprise a control unit for controlling operation of the apparatus and/or for processing the measured values obtained from the sensor element. The apparatus may comprise a memory for storing a computer program. When executed by one or more data processors, the computer program may cause the apparatus for example, to measure the optical signal values and/or to process the optical signal values.

The apparatus may comprise a memory for storing operating parameters. The operating parameters may specify for example, the duration(s) of integration time period(s) for the plurality of pixels of the sensor element, and the number(s) of excitation laser pulses used to generate optical radiation, including Raman-scattered light, in the target during the measurement.

The apparatus may comprise a user interface for providing information to a user and/or for receiving user input from the user. The user interface may comprise for example, a display, touch screen and/or a keypad. For example, the user interface may be configured to graphically display a measured time-resolved optical spectrum. For example, the user interface may be configured to display a graph, such as a histogram, which represents a measured time-resolved optical spectrum.

The apparatus may comprise communication unit for sending and/or receiving data. The communication unit may be arranged to communicate with a local area network, with the Internet, and/or with mobile communications network. The apparatus may also be arranged perform data processing in a distributed manner, such as by using an Internet server.

The time-resolved optical spectrum measured by the apparatus may be compared with a reference data for example, in order to identify a target. The time-resolved optical spectrum measured by the apparatus may be compared with a reference data in order to determine chemical composition of the target. The height and/or position of one or more spectral peaks of the measured time-resolved optical spectrum may be used for estimating a concentration of a substance in the target. The spectral and temporal shape of the measured optical emission pulse may be used to determine for example the photoluminescence decay shape.

According to an embodiment the time-resolved optical spectrum is time-gated Raman spectrum. In said embodiment the measured spectrum is a time-gated Raman spectrum.

The present disclosure also relates to the method as described above. Various embodiments and variants disclosed above apply mutatis mutandis to the method.

The method for measuring time-resolved optical spectrum comprises generating a pulse of light towards a target, wherein the target emits an optical radiation; providing a time delay to a first portion of the emitted optical radiation passing therethrough, wherein the emitted optical radiation further comprises a second portion which bypasses the at least one optical delay element; dispersing the delayed first portion and the second portion of the emitted optical radiation into a dispersed radiation having a plurality of wavelengths, wherein each wavelength of the dispersed radiation is split into an angularly separate direction, and wherein the dispersed radiation of each portion exit the optical spectral disperser with predetermined relative delays; and receiving each wavelength of the dispersed radiation on a different spatial region of the sensor element thereof, measure the light intensity associated with each wavelength of the dispersed radiation; and collecting the amount of light intensity associated with each wavelength of the dispersed radiation to form a time-gated optical spectrum. According to one embodiment the time-gated optical spectrum is a time-gated Raman spectrum.

Optionally, the method for measuring the time-resolved optical spectrum further comprises directing the generated pulse of light from the light source towards the target using a first optical fibre and directing the fraction of the optical radiation from the target to the spectrometer using a second optical fibre.

Optionally, the method for measuring the time-resolved optical spectrum further comprises gathering the generated pulse of light from the light source and focusing the generated pulse of light towards the target using at least one optical member.

Optionally, the sensor element further comprises a plurality of pixels on each of the different spatial region, and wherein the plurality of pixels on each of the spatial region receive a separate wavelength of the dispersed radiation and measure the amount of light intensity associated with each wavelength of the dispersed radiation. Further optionally, the sensor element remains in an "ON-state" for a predetermined period of time when the dispersed radiation is received by the sensor element. Optionally, the method of measuring time-resolved optical spectrum refers to measuring time-gated Raman spectrum. Further optionally the pulse of light is generated with a laser.

DETAILED DESCRIPTION OF THE DRAWINGS

Referring to FIG. 1, there is shown a block diagram of an apparatus 100 for measuring time-gated Raman spectrum, in accordance with an embodiment of the present disclosure. The apparatus 100 for measuring the time-gated Raman spectrum (as a specific example of measuring a time-resolved optical spectrum) comprises a light source 102 to generate pulse of light. The apparatus 100 further comprises a first optical fibre 104 to provide an optical path to the generated pulse of light from the light source 102. Moreover, the apparatus 100 comprises an optical member 106 to gather the generated pulse of light from the first optical fibre 104 and focus the gathered pulse of light 108 towards a target 110. Furthermore, the apparatus 100 comprises optics 112, such as a lens to collect emitted optical radiation, including emitted Raman-scattered light 114 emitted by the target 110 and a second optical fibre 116 to direct the optical radiation towards a sensor arrangement 118. Moreover, the apparatus 100 comprises a controller 120 operatively coupled to the light source 102 and the sensor arrangement 118. The controller 120 is operable to collect an amount of light intensity associated with each wavelength of dispersed radiation 122 measured by the sensor arrangement 118 to form a time-gated Raman spectrum.

Figure 2:
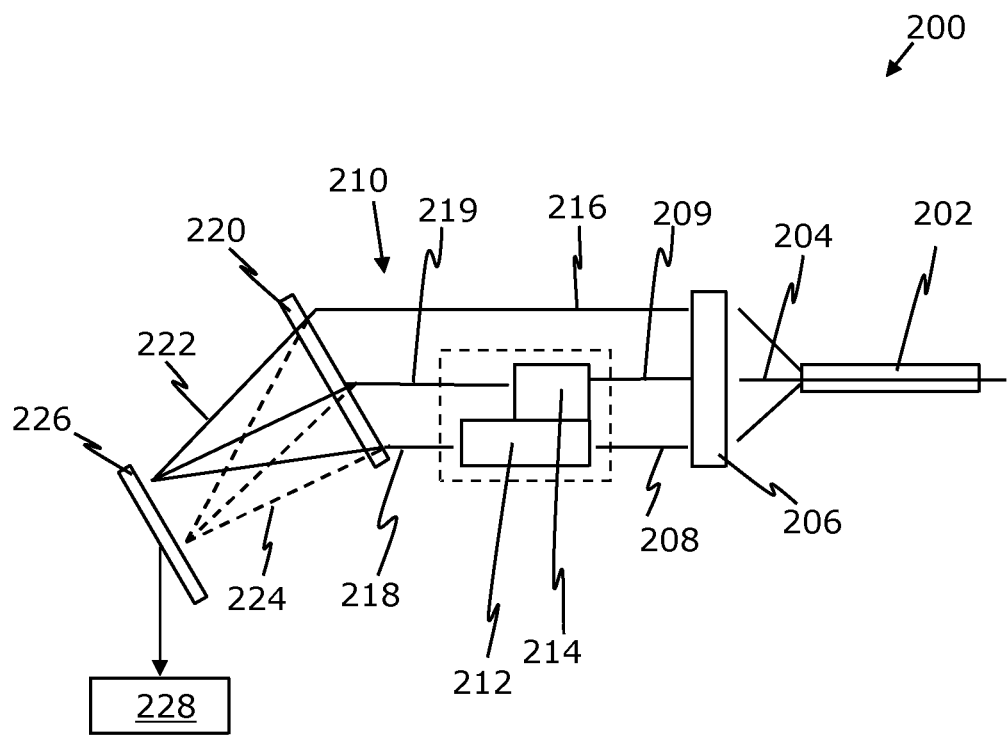
FIG. 2 is a schematic illustration of a sensor arrangement implemented in the apparatus of FIG. 1 for measuring time-resolved optical spectrum, in accordance with an embodiment of the present disclosure.

Referring to FIG. 2, there is shown a schematic illustration of a sensor arrangement 200 implemented in the apparatus 100 of FIG. 1 for measuring time-gated Raman spectrum, in accordance with an embodiment of the present disclosure. The second optical fibre 202 provides the optical path to the emitted optical radiation 204. The emitted optical radiation 204 is received by the collimating element 206 to collimate the optical emitted radiation 204. An optical path of a first portion 208 of the collimated emitted optical radiation 210 is provided with an optical delay element 212 and an optical delay element 214 to impart a time delay to the first portion 208. A second portion 216 of the collimated emitted optical radiation 210 bypasses (i.e. does not go via) the optical delay elements 212 and 214. The delayed first portion 218 and the second portion 216 is received by the optical spectral disperser 220 at a same time such that the delayed first portion 218 and the second portion 216 exits the optical spectral disperser 220 in form of a dispersed radiation comprising a first spectral component 222 having a first wavelength and a second spectral component 224 having a second wavelength in unison. The dispersed radiation is received by the sensor element 226 by predetermined delays. The controller 228 receives measured spectral values associated with the dispersed radiation. Furthermore, a third portion of the collimated emitted optical radiation 209 is provided with an optical delay element 214 to form a third delayed portion 219.

Figure 3:
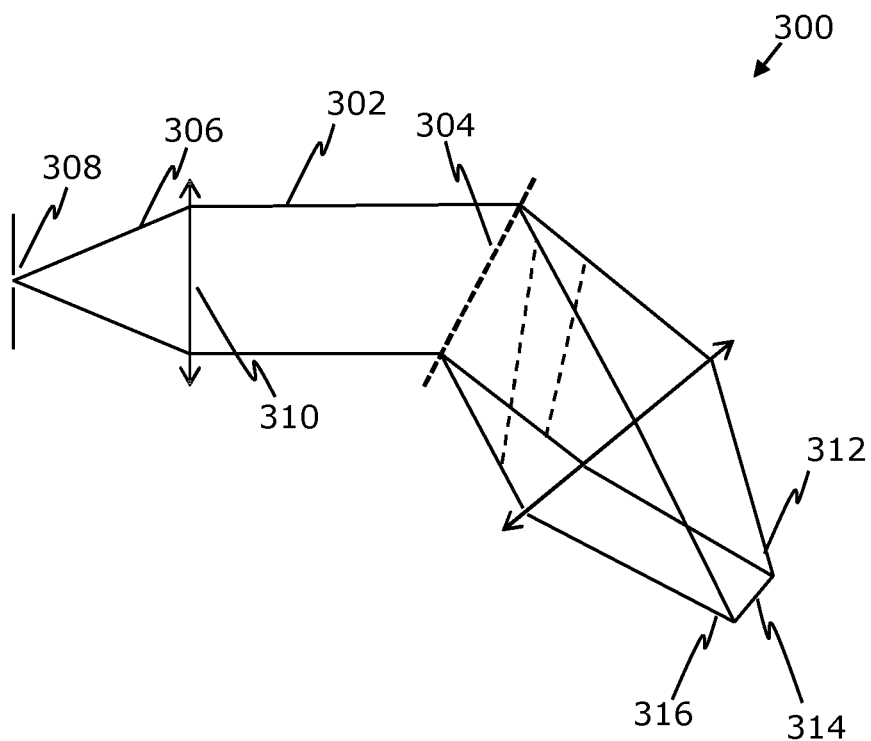
FIG. 3 is a schematic illustration of an arrangement depicting a collimated emitted optical radiation split into a dispersed radiation when passed through a diffraction grating, in accordance with an embodiment of the present disclosure.

Referring to FIG. 3, there is shown a schematic illustration of an arrangement 300 depicting a collimated beam of optical radiation 302 split into a dispersed radiation when passed through a diffraction grating 304, in accordance with an embodiment of the present disclosure. The collected optical radiation 306 is received by the spectrograph via an input slit 308. The emitted optical radiation 306 is collimated by passing the emitted optical radiation 306 through the collimating element 310. Moreover, the collimated emitted optical radiation 302 is passed through a diffraction grating 304 in order to split the collimated optical radiation 302 into a dispersed radiation. As shown, a spectral component 312 is received on one spatial region of a sensor element 314, whereas a spectral component 316 is received on another spatial region of the sensor element 314 to form the time-gated Raman spectrum.

Figure 4A:
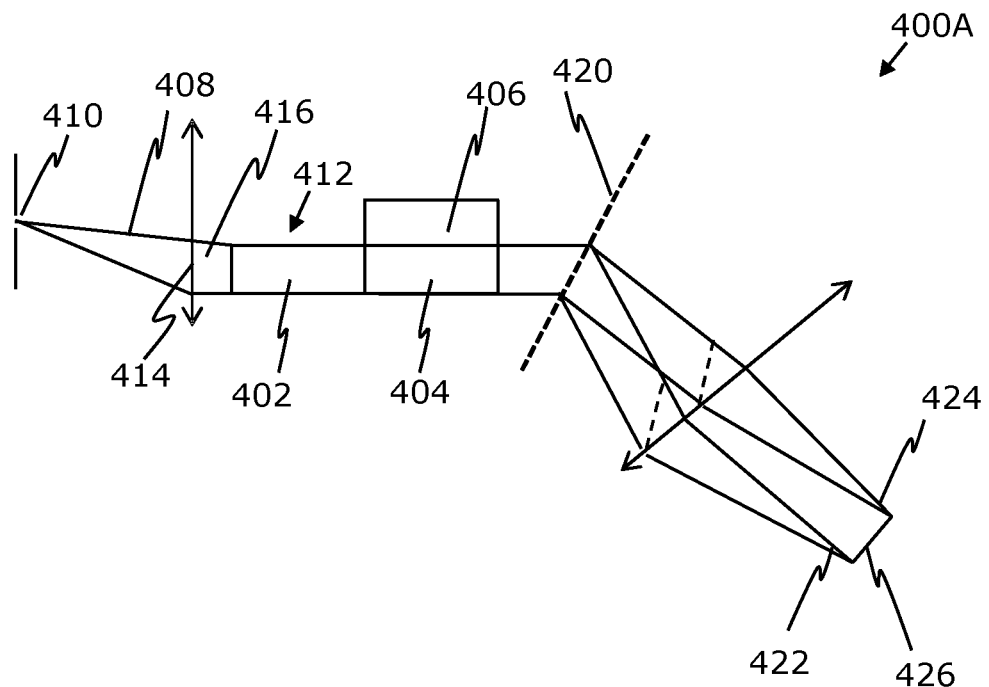
FIGS. 4A-B are schematic illustrations of arrangements employing light-transmission segmentation, wherein optical delay elements are incorporated as glass blocks, in accordance with an embodiment of the present disclosure.
Figure 4B:
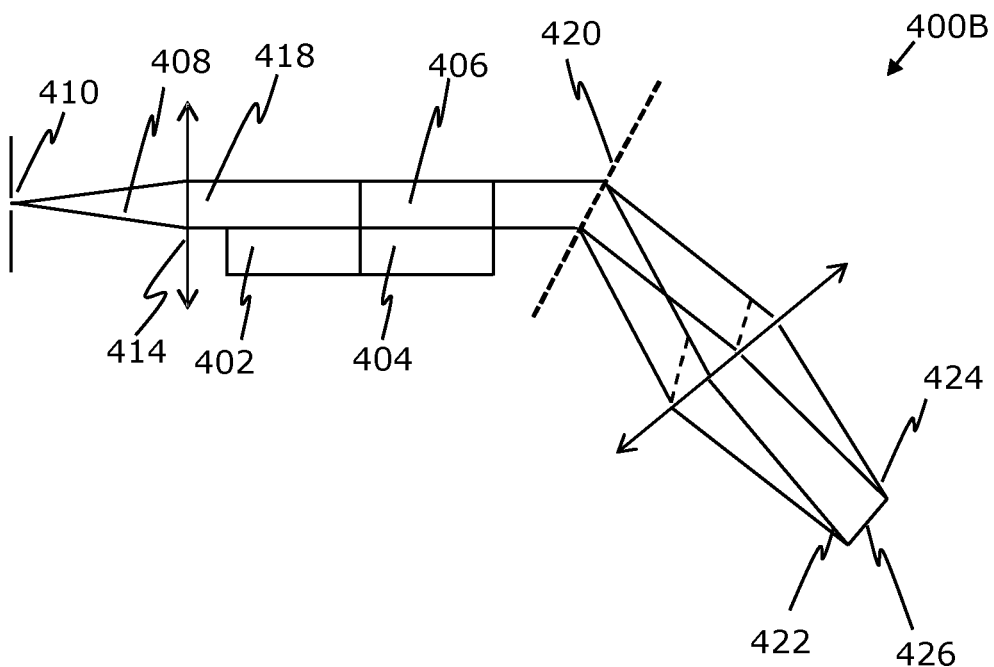

Referring to FIGS. 4A-B, there are shown schematic illustrations of arrangements 400A, 400B employing light-transmission segmentation, wherein optical delay elements 402, 404 and 406 are incorporated as glass blocks, in accordance with an embodiment of the present disclosure.

The collected emitted optical radiation 408 is received via the aperture 410 representing the input slit of the spectrograph. The collimated optical radiation 412 received from the collimating element 414 is divided into three portions, i.e. a lower portion 416, a middle portion 418 and an upper portion (not shown). The lower portion 416 and the middle portion 418 corresponds to the first portion of the collimated optical radiation 412, whereas the upper portion corresponds to the second portion of the collimated optical radiation 412. As shown in FIG. 4A, the optical path of the lower portion 416 comprises two successive optical delay elements 402 and 404 incorporated as the glass blocks to provide a time delay to the lower portion 416. As shown in FIG. 4B, the optical path of the middle portion 418 comprises one optical delay element 406 incorporated as the glass block to provide a time delay to the middle portion 418. It will be appreciated that the optical path of the lower portion 416 is less than the optical path of the middle portion 418, therefore, the lower portion 416 is imparted with more time delay than the middle portion 418. Such arrangements 400A, 400B of the optical delay elements 402, 404 and 406 allows the delayed first portion and the second portion to be received by the diffraction grating 420 with suitable relative delay. The delayed first portion and the second portion is received by the diffraction grating 420 with such relative delays that the delayed first portion and the second portion, after exiting the diffraction grating 420, travel with predetermined relative delays. In the same figure are also illustrated two example parts the dispersed radiation comprising the first spectral component 422 having the first wavelength and the second spectral component 424 having a second wavelength in predetermined relative delays. The dispersed radiation is received by the sensor element 426 in predetermined delays to measure time-resolved spectrum by controlling sensor elements.

Figure 5A:
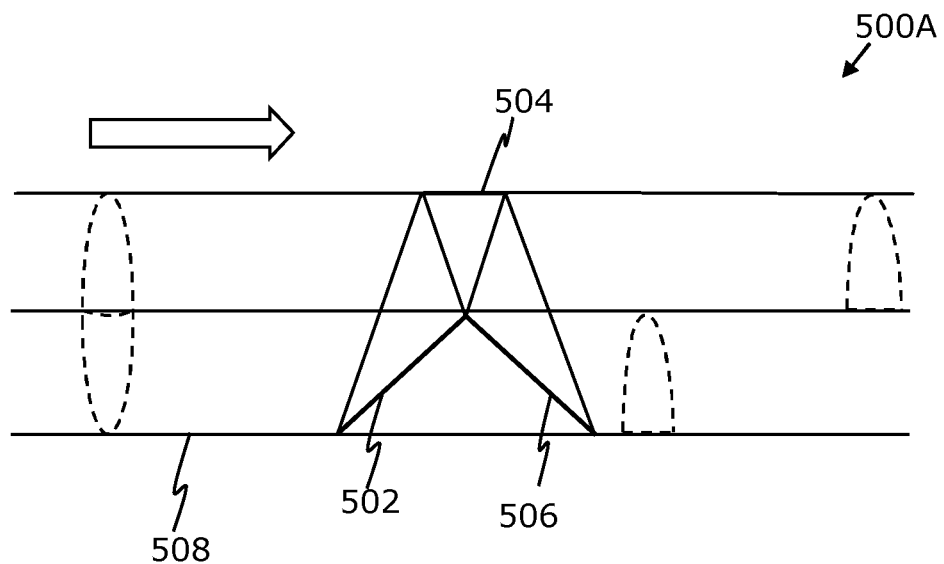
FIGS. 5A-B are schematic illustrations of arrangements employing light-transmission segmentation, wherein optical delay elements are incorporated as mirrors, in accordance with an embodiment of the present disclosure.
Figure 5B:
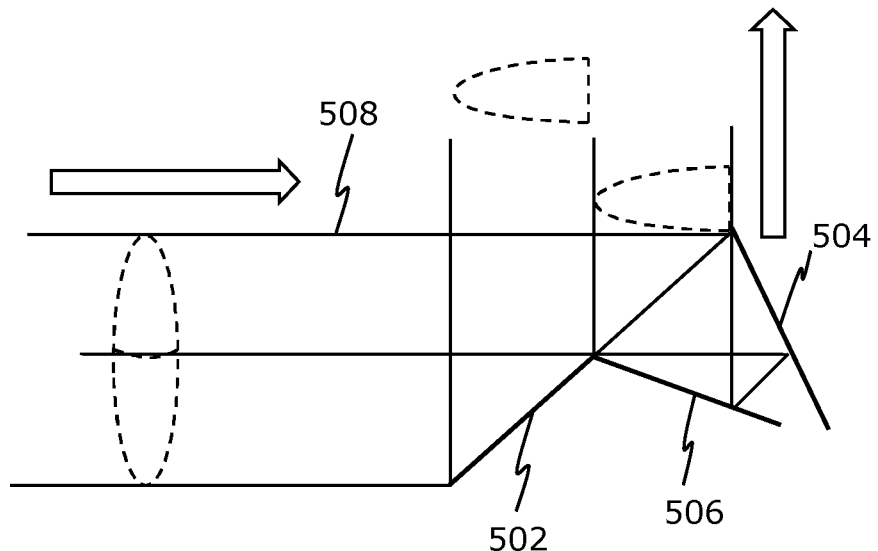

Referring to FIGS. 5A-B, there are shown schematic illustrations of arrangements 500A, 500B employing light-transmission segmentation, wherein optical delay elements are incorporated as mirrors 502, 504 and 506, in accordance with an embodiment of the present disclosure. As shown in FIG. 5A, three mirrors 502, 504 and 506 are arranged in the optical path of the first portion 508 of the collimated emitted optical radiation. The arrangement 500A of mirrors 502, 504 and 506 is such that the mirrors 502, 504 and 506 represent a purely reflective equivalent of a dove prism. The employment of such an arrangement 500A enables one portion having a less optical path than another portion of the first portion 508 to achieve more time delay, such as to be received by the sensor element in unison. As shown in FIG. 5B, three mirrors 502, 504 and 506 are arranged in the optical path of the first portion 508 of the collimated emitted optical radiation. The arrangement 500B of mirrors 502, 504 and 506 is such that the mirrors 502, 504 and 506 provides an equivalent effect of the dove prism and a folding mirror. Moreover, the mirrors 504 and 506 form a reflective equivalent of a Penta prism.

Figure 6:
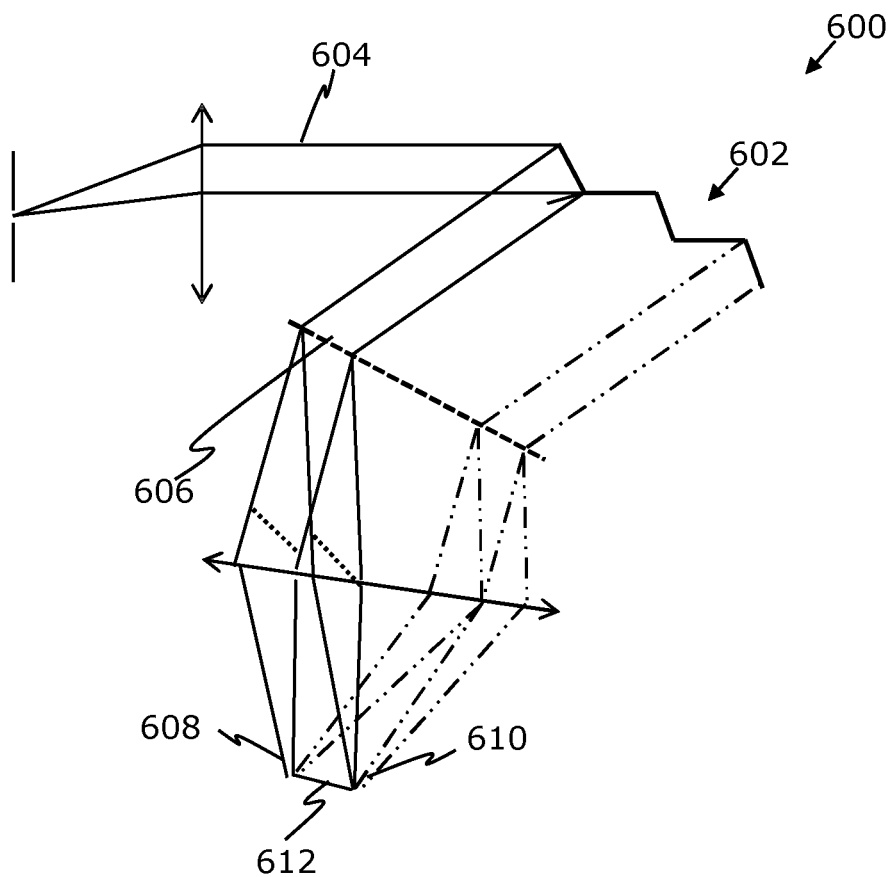
FIG. 6 is a schematic illustration of an arrangement employing light-reflection segmentation, in accordance with an embodiment of the present disclosure.

Referring to FIG. 6, there is shown a schematic illustration of an arrangement 600 employing light-reflection segmentation, in accordance with an embodiment of the present disclosure. As shown, a series of mirrors 602 in an echelon formation are placed in the optical path of the collimated emitted optical radiation. The first portion 604 of the collimated emitted optical radiation arrives at each of the series of mirrors 602 and gets reflected towards the diffraction grating 606. Such mirrors 602 provides time delay to the first portion 604 of the collimated optical radiation. The delayed first portion and the second portion (not shown) therefore, exits the diffraction grating 606 in unison. Thus, the spectral components 608 and 610 of the dispersed radiation reach the sensor element 612 in unison.

Figure 7A:
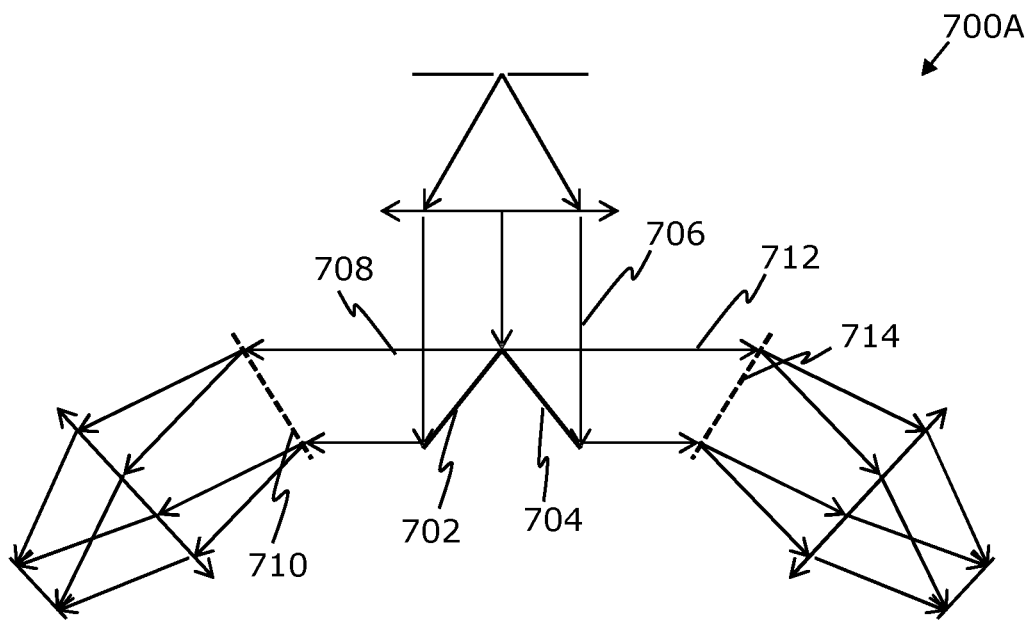
FIGS. 7A, 7B and 7C are schematic illustrations of arrangements employing light-splitting segmentation, in accordance with an embodiment of the present disclosure.
Figure 7B:
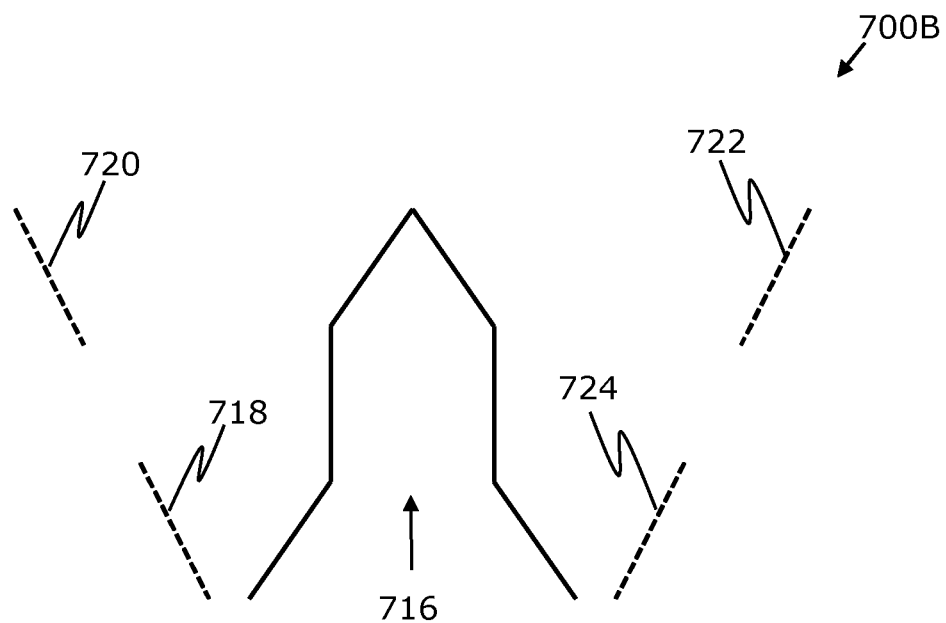
Figure 7C:
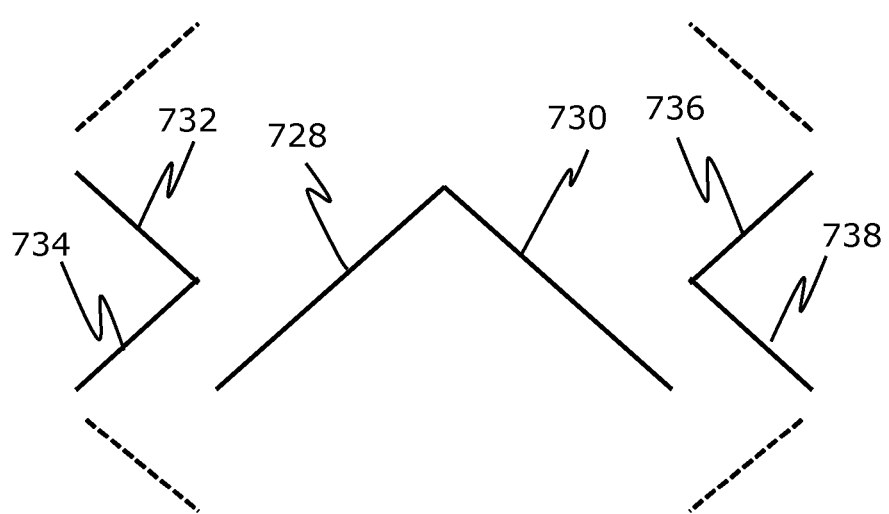

Referring to FIGS. 7A-C, there are shown schematic illustrations of 3o arrangements 700A, 700C employing light-splitting segmentation, in accordance with an embodiment of the present disclosure. As shown in FIG. 7A, the arrangement 700A comprises two mirrors 702 and 704, such as plane mirrors that split the incoming collimated optical radiation 706 in two parts. A first part 708 of the split collimated optical radiation is received by a first diffraction grating 710, whereas a second part 712 of the split collimated emitted optical radiation is received by a second diffraction grating 714. Such an arrangement 700A replicating a "spruce" design halves a temporal broadening while keeping the wavelength resolution unaffected. As shown in FIG. 7B, the arrangement 700B comprises a series of reflective surfaces such as mirrors 716. Such an arrangement 700B requires four separate diffraction gratings 718, 720, 722 and 724 and consequently, four sensor elements (not shown). As shown in FIG. 7C, the arrangement 700C comprises six mirrors 728, 730, 732, 734, 736 and 738. Two mirrors 728 and 730 are arranged to split the collimated emitted optical radiation (not shown) in two parts. Moreover, each part of the split collimated emitted optical radiation is further divided in two parts by using mirrors 732 and 734 on one side and mirrors 736 and 738 on other side. Furthermore, four diffraction gratings (such as the diffraction gratings 718, 720, 722 and 724 of the FIG. 7B) are employed to receive the collimated emitted optical radiation in four parts. Notably, four sensor elements (not shown) are required for measuring light intensities associated with the dispersed radiation for such an arrangement 700C comprising four diffraction gratings (such as the diffraction gratings 718, 720, 722 and 724 of FIG. 7B).

Figure 8A:
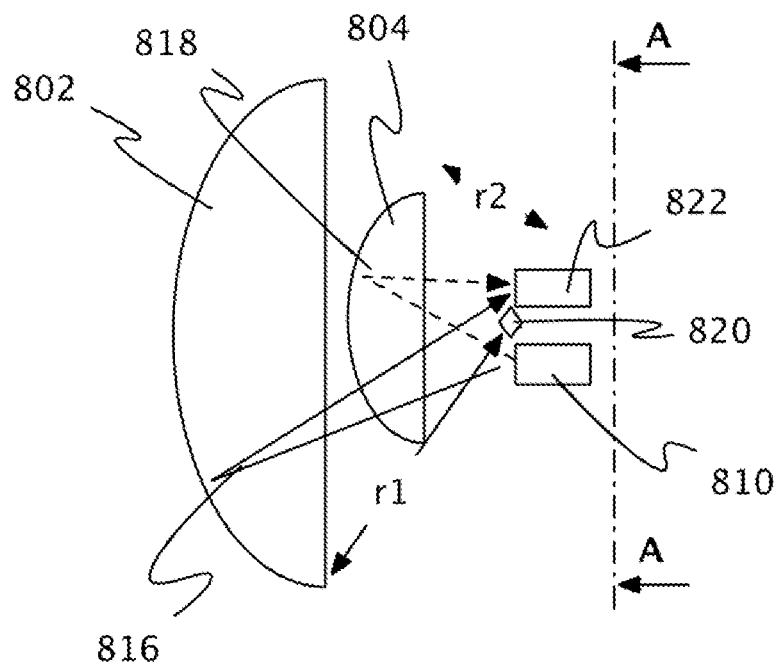
FIGS. 8A and 8B are schematic illustration of arrangements for arranging optical delay segmentation for a non-collimated emitted optical radiation.
Figure 8B:
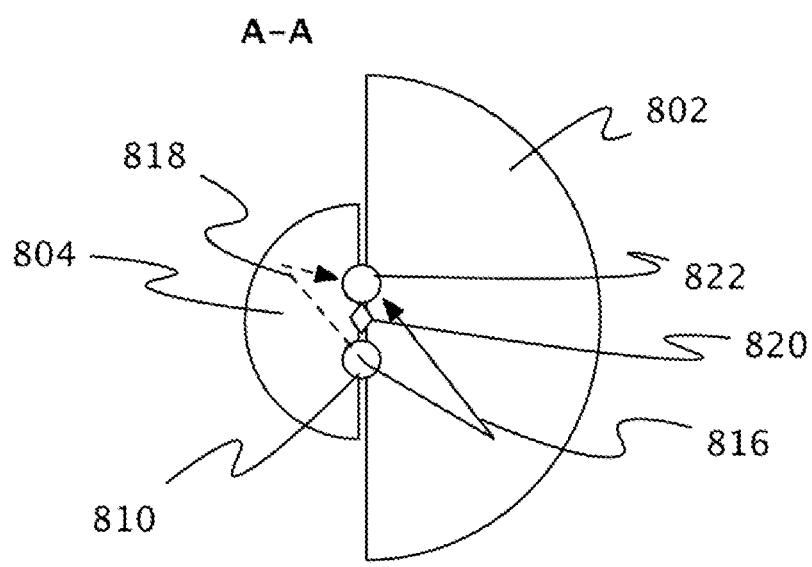

FIGS. 8A and 8B are illustrations of using arrangement of a first spherical mirror 802 with radius of curvature of r1 and a second spherical mirror 804 with radius of curvature of r2 as optical delay elements. FIG. 8A is illustration as seen from a side of the arrangement and FIG. 8B is seen from direction A-A of the arrangement. The collected optical radiation is received via a slit 810. The input emitted optical radiation from the slit 810 is a diverging beam. A first portion 816 (marked with solid line in the figures) of the emitted optical radiation travels the optical length of 2×r1 as it travels from the input slit 810 via the first mirror 802 to an output 822. A second portion 818 (marked with dashed line in figures) travels the optical length of 2×r2 from input slit 810 via mirror 804 to output 822. The first spherical mirror 802 and the second spherical mirror 804 have a common centre of curvature point 820. As an example, if r1 is 30 cm and r2 is 15 cm an optical delay of $(30 \times 2 - 15 \times 2)$ cm$/(3 \times 10^8$ m/s$)=1$ ns between the first and the second portions.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for measuring time-gated Raman spectrum, the apparatus comprising:
   a light source for generating a pulse of light towards a target, wherein the target will subsequently emit an optical radiation comprising at least a first portion and a second portion;
   a sensor arrangement for measuring the intensity of the optical radiation; and
   a controller operatively coupled to the light source and the sensor arrangement; wherein the sensor arrangement comprises:
   at least one optical delay element to provide a time delay to the first portion of the emitted optical radiation, wherein the second portion of the emitted optical radiation bypasses the at least one optical delay element;
   an optical spectral disperser to disperse the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and
   a sensor element configured to receive each wavelength of the dispersed radiation on a different spatial region thereof, and to measure light intensity associated with each wavelength of the dispersed radiation;
   and wherein the controller is configured to record the measured light intensity associated with each wavelength of the dispersed radiation measured by the sensor element to form a time-resolved optical spectrum.

2. The apparatus according to claim 1, wherein the apparatus for measuring the time-resolved optical spectrum further comprises a first optical fibre to direct the generated pulse of light from the light source towards the target and a second optical fibre to direct the emitted optical radiation to the optical spectral disperser.

3. The apparatus according to claim 1, wherein the apparatus for measuring the time-resolved optical spectrum further comprises at least one optical member to gather the generated pulse of light from the light source and to focus the generated pulse of light towards the target.

4. The apparatus according to claim 1, wherein the at least one optical delay element comprises at least one of: a length of free space, a prism made of glass, a cuboid made of glass, a Dove prism made of glass, a penta prism made of glass, a prism made of crystal material, a cuboid made of crystal material, a Dove prism made of crystal material, a penta prism made of crystal material, a mirror arrangement, a lens, an optical fibre.

5. The apparatus according to claim 1, wherein at least the first portion of the emitted optical radiation is arranged to pass multiple times through at least one optical delay element.

6. The apparatus according to claim 1, wherein the optical spectral disperser comprises at least one of: a diffraction grating, a prism, a Fabry-Perot etalon.

7. The apparatus according to claim 6, wherein the optical spectral disperser comprises a diffraction grating, and the delayed first portion and the second portion of the emitted optical radiation is configured to be directed towards the sensor element through the optical spectral disperser employing the diffraction grating using at least one of: light-transmission segmentation, light-reflection segmentation, light-splitting segmentation.

8. The apparatus according to claim 1, wherein the sensor element further comprises a plurality of pixels on each of the different spatial regions, and wherein the plurality of pixels on each of the spatial regions is configured to receive a separate wavelength of the dispersed radiation and to measure the light intensity associated with each wavelength of the dispersed radiation.

9. The apparatus according to claim 1, wherein the sensor element is operable to be in an "ON-state" for a predetermined period of time when the dispersed radiation is received by the sensor element.

10. The apparatus according to claim 1, further comprising at least one collimating element to collimate the optical radiation received from the target, the at least one collimating element being arranged on an optical path between the target and the at least one delay element.

11. The apparatus according to claim 10, wherein the at least one collimating element comprises at least one of: a lens arrangement, a mirror arrangement, an aperture incorporated via a pinhole or a slit, an optical waveguide.

12. The apparatus according to claim 1, further comprising at least one collimating element to collimate the optical radiation received from the target, the at least one collimating element being arranged on an optical path between the at least one delay element and the sensor element.

13. The apparatus according to claim 1, wherein the light source is a laser.

14. A method for measuring time-gated Raman spectrum, wherein the method comprises:
   generating a pulse of light towards a target, wherein the target will subsequently emit an optical radiation comprising at least a first portion and a second portion;
   providing a time delay to the first portion of the emitted optical radiation, wherein the second portion of the emitted optical radiation bypasses the at least one optical delay element;
   dispersing the delayed first portion and the second portion of the emitted optical radiation into a dispersed radiation having a plurality of wavelengths, wherein each wavelength of the dispersed radiation is split into an angularly separate direction, and wherein the dispersed radiation of each portion exits the optical spectral disperser with predetermined relative delays; and
   receiving each wavelength of the dispersed radiation on a different spatial region thereof, and measuring the light intensity associated with each wavelength of the dispersed radiation;
   recording the measured light intensity associated with each wavelength of the dispersed radiation measured by the sensor element to form a time-resolved optical spectrum.

15. The method according to claim 14, wherein the method for measuring the time-resolved optical spectrum further comprises directing the generated pulse of light from the light source towards the target using a first optical fibre and directing the emitted optical radiation to the optical spectral disperser using a second optical fibre.

16. The method according to claim 14, wherein the method for measuring the time-resolved optical spectrum further comprises gathering the generated pulse of light from the light source and focusing the generated pulse of light towards the target using at least one optical member.

17. The method according to claim 14, wherein the sensor element further comprises a plurality of pixels on each of the different spatial regions, and wherein the plurality of pixels on each of the spatial regions receive a separate wavelength of the dispersed radiation and measure the light intensity associated with each wavelength of the dispersed radiation.

18. The method according to claim 14, wherein the sensor element remains in an "ON-state" for a predetermined period of time when the dispersed radiation is received by the sensor element.

19. The method according to claim 14, further comprising collimating the optical radiation.

* * * * *